W. J. BLIFFERT.
SPRING FORK FOR CYCLES.
APPLICATION FILED AUG. 18, 1919.
1,330,933.
Patented Feb. 17, 1920.
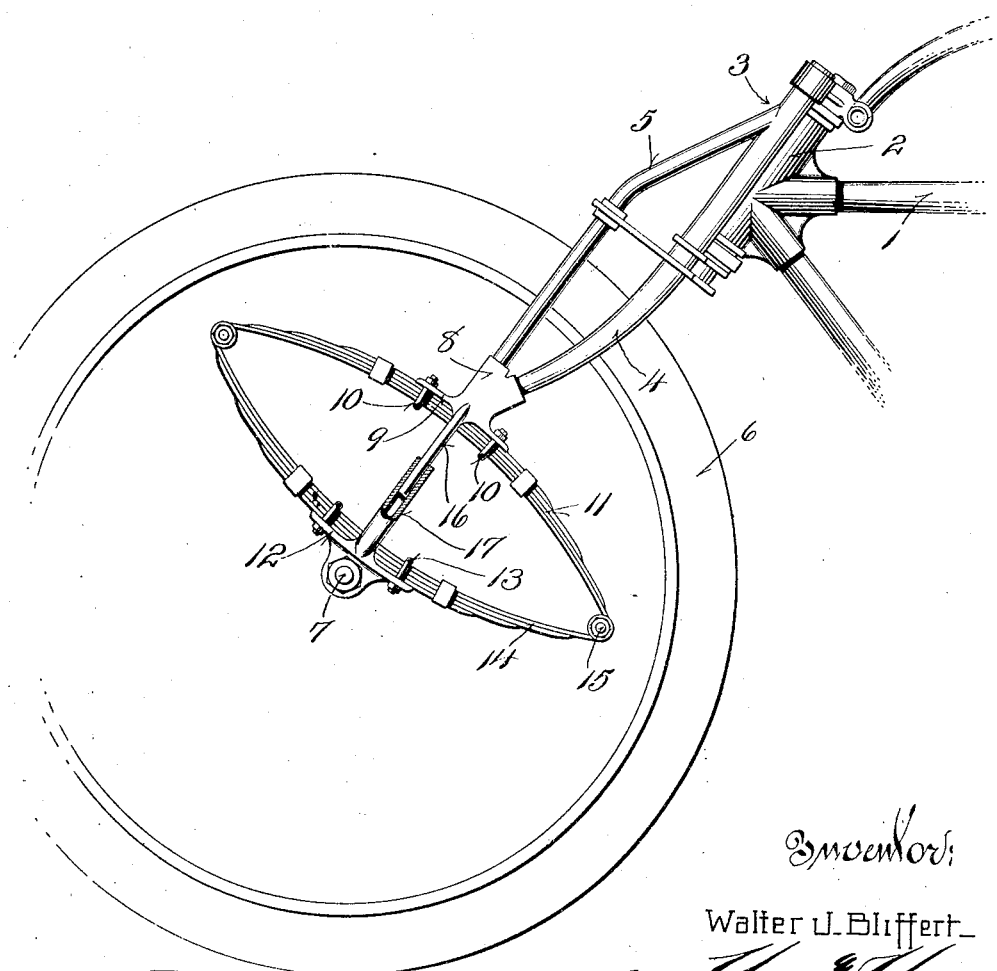
Inventor:
Walter J. Bliffert
By Young & Young
Attorneys

UNITED STATES PATENT OFFICE.

WALTER J. BLIFFERT, OF MILWAUKEE, WISCONSIN.

SPRING-FORK FOR CYCLES.

1,330,933.  Specification of Letters Patent. Patented Feb. 17, 1920.

Application filed August 18, 1919. Serial No. 318,153.

*To all whom it may concern:*

Be it known that I, WALTER J. BLIFFERT, a citizen of the United States, and resident of Milwaukee, in the county of Milwaukee and State of Wisconsin, have invented certain new and useful Improvements in Spring-Forks for Cycles; and I do hereby declare that the following is a full, clear, and exact description thereof.

My invention relates to new and useful improvements in spring frames or like cushioning means for various types of cycle vehicles, particularly motorcycles.

The principal object of the invention is to provide an improved combination of old and well known elements whereby maximum shock absorbing may be procured between the supporting wheels and forks or corresponding parts of cycle vehicle frames.

A further object is to provide means in connection with an elliptical spring for retaining the two parts of the same against longitudinal or lateral shifting with respect to each other and the parts to which they are connected.

With these and additional objects in view, the invention resides in the novel features of construction, combination and arrangement of parts which will be hereinafter more particularly described and claimed and shown in the drawing.

The illustrated embodiment of the invention as depicted in the drawing, wherein the front end of a motorcycle having the invention applied is shown, consists broadly of an elliptical spring disposed between one end of the axle of one of the supporting wheels and the lower end of the adjacent fork bar. One of these springs may be located on each side of each of the front wheels and also disposed for operation with the rear wheel or wheels.

Referring more particularly to the drawing, it will be seen that the numeral 1 denotes a portion of a motorcycle frame having a steering head 2 and a front fork 3. The latter has its steering post journaled in the steering head 2 and includes the usual main fork bars 4 and supplemental fork bars 5, one of each being positioned on each side of a wheel 6. The wheel which is of a conventional type includes an axle 7, and as shown the invention is located between this axle and a socket coupling 8 which connects the lower ends of each adjacent supplemental and main fork bars.

The coupling 8 includes oppositely and laterally extending attaching flanges 9 which project parallel to the central longitudinal plane of the wheel 6 and are adapted to form a clip plate with which clip yokes 10 coöperate. Said clip yokes secure a curved superposed leaf spring 11 to the coupling 8 and consequently to the lower end of the fork bars 4 and 5.

A second clip plate 12 is pivoted upon the axle 7 transversely of the longitudinal axis thereof and has clip yokes 13 coöperating therewith to secure a second curved superposed leaf spring 14 thereto. It will be noted that both of the springs 11 and 14 are secured to the clip plates 9 and 12 respectively substantially midway their ends, and that the opposite corresponding ends thereof are shackled or pivoted together as at 15, thereby forming a standard elliptical leaf spring.

The springs 11 and 14 are held against horizontal and lateral shifting with respect to each other by a guide means which includes a guide stem or plunger 16 extending downwardly from the coupling 8 and toward the spring 14, and a sleeve or socket 17 projecting from the clip plate 12 toward the other spring 11. Thus the stem slidably and telescopingly engages in the sleeve 17 when the springs 11 and 14 move toward and away from each other.

From the foregoing description taken in connection with the accompanying drawing, it will be evident that the spring attaching means including the flanges 9 and plate 12 retain the springs 11 and 14 in proper position and parallel to said central longitudinal plane of the wheel 6, while the stem 16 and sleeve 17 retain the coupling 8 alined with the clip plate 12. A most efficient structure is thereby furnished and one in which the shock absorbing qualities will be more predominant than in the usual spring fork absorbing means, and in which the force acting on said spring is exerted in a line extending from the axle 7, through the center of the plates 9 and 12 and through the fork longitudinally thereof. Various changes may be made in the shape and size and in the manner of connecting the several parts of the springs together, and to the adjacent elements of the vehicle as well as other variations in the combination and location of the several parts of the invention and the vehicle, without departing from or sacrificing any of the principles of the invention.

I claim:

1. In a cycle of the class described, the combination with a wheel, an axle therefor, a vehicle frame having a fork, of a substantial elliptical compound leaf spring disposed transversely of the axle above the same, a bracket for securing the axle to the mid portion of the lower leaf exteriorly of the spring, a second bracket for securing the mid portion of the upper leaf to the lower end of the fork, a centrally located stem extending interiorly of the spring from the mid portion of the upper leaf and toward the like portion of the lower leaf, and a centrally located guide socket extending interiorly of the spring from the mid portion of the lower leaf and toward the like portion of the upper leaf for slidably receiving said stem to retain the leaves of said spring in alinement.

2. In a cycle of the class described, the combination with a wheel, an axle therefor, a vehicle frame having a fork, of a substantial elliptical compound leaf spring disposed transversely of the axle above the same, means for securing the mid portion of the lower leaf to the axle, means for securing the mid portion of the upper leaf to the lower end of said fork, whereby the mid portions of the spring leaves and the axle and fork are alined so that the force acting on said spring will be exerted in a line extending from the axle through the central portions of each of the leaves of said spring and through the fork longitudinally thereof, and means for holding the central portions of the leaves of said spring in said line.

In testimony that I claim the foregoing I have hereunto set my hand at Milwaukee, in the county of Milwaukee and State of Wisconsin.

WALTER J. BLIFFERT.